Dec. 15, 1936.    P. C. KEITH, JR    2,064,757
PROCESS FOR THE TREATMENT OF HYDROCARBON OIL
Filed July 26, 1934
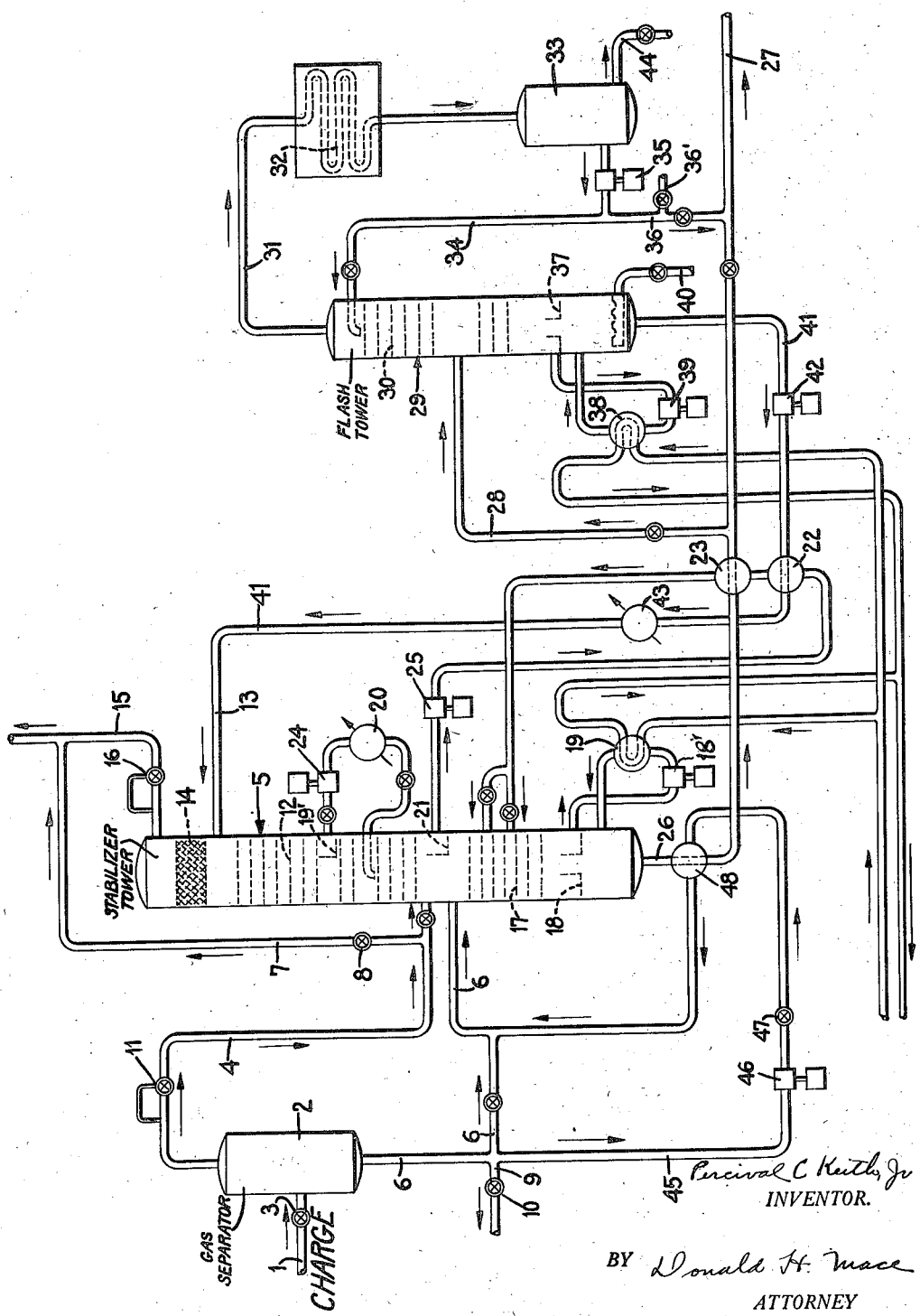

Patented Dec. 15, 1936

2,064,757

UNITED STATES PATENT OFFICE 2,064,757

PROCESS FOR THE TREATMENT OF HYDROCARBON OIL

Percival C. Keith, Jr., Peapack, N. J., assignor to Gasoline Products Co. Inc., Newark, N. J., a corporation of Delaware Application July 26, 1934, Serial No. 737,012

2 Claims. (Cl. 196—11)

This invention relates to improvements in combined stabilization and absorption processes and pertains more particularly to an improved process and equipment of extremely simple nature for accomplishing simultaneously the absorption and recovery of valuable gasoline constituents from gas containing such gasoline constituents in vapor form, and the stabilization of the gasoline or other oil; this process serving to remove from the gasoline undesirable light components, which, if retained, would give an inferior product, which product would suffer undue evaporation loss on subsequent handling and storage, and be otherwise objectionable.

It is an object of my invention to provide an improved process and apparatus for the stabilization of gasoline or other light distillates and for the simultaneous absorption from the evolved gases, of constituents falling in the boiling range of the final desired liquid product; this process being of such character that the absorbing oil medium is cyclically circulated through the absorbing zone, so that substantially an unlimited effective supply thereof is available, this absorption medium falling in the boiling range of the final desired product.

In accordance with my invention the gas-containing distillate, which is to be treated, is introduced into a separating zone, either with or without an accompanying reduction in pressure, and in this zone is partially separated into gaseous and liquid components. These components are then introduced into a combined stabilization and absorption zone, the gas being preferably introduced at a higher level than the liquid. In this zone the gases and vapors pass upwardly against a downwardly flowing stream of absorber oil and are thereby freed of fractions which are desirable for inclusion in the final liquid product, the dry residue gases passing off from the top of the zone. The liquids on the other hand pass downwardly through the stabilization section of the zone against a rising current of evolved vapors and are therein freed of undesirably light constituents, which then pass upwardly through the absorbing zone. Heat is supplied to the base of the stabilizing section of the combined zone in order to effect the necessary stripping action, and stabilized gasoline, having the desired freedom from light constituents, is withdrawn from the base of the combined zone and then subjected to distillation in a separate zone preferably under reduced pressure, after having been preheated if desired. In this distilling or flashing zone lighter constituents of the gasoline pass off as vapors leaving the heavy ends of the gasoline as liquid, liquid so separated being introduced into the top of the combined zone as the absorbing oil therefor. The final desired stabilized gasoline is obtained by withdrawing directly from the process a quantity of the stabilized gasoline collecting in the base of the combined stabilization and absorption zone, this being preferably blended with lighter distillate resulting from the said distillation in the separate zone. Various heat exchangers are provided in order to obtain the necessary heat for efficient operation.

If desired, only the gas or only the liquid component of the initial charging stock, may be introduced into the stabilization and absorption zone for treatment, or only a portion of both of these constituents may be introduced. The initial distillate to be treated may be derived from a cracking process, in which event it would be the condensate derived by condensing the vapors from the fractionating equipment, or a condensate of this nature which has been partially freed of lighter products, as for example, by a reduction in the pressure thereof. Or the distillate to be treated may be obtained from other sources. It may be, for example, a so-called wild virgin gasoline or naphtha.

The above mentioned and further objects and advantages of my invention and the manner of obtaining them will be more fully explained in the following description taken in conjunction with the accompanying drawing.

The single figure of the drawing represents diagrammatically a system embodying my invention.

Referring more particularly to the drawing, reference numeral 1 indicates a charging line through which the distillate to be treated is introduced into a gas separator 2, the pressure in this gas separator either being the same as that of the line 1 or lower, reduced pressure, when desired, being obtained by means of the control valve 3. In the vessel 2 gases and light vapors separate from liquids, the former passing overhead through vapor line 4 into an intermediate point in the combined stabilization and absorption tower 5 while the liquid passes off from the bottom of the vessel through line 6 into the tower 5, preferably at a point below that of the introduction of the gases. The liquid introduced into the combination tower 5 through line 6 is preferably first preheated, for example by indirect heat exchange with stabilized gasoline withdrawn from the base of the tower, this heat exchange being effected by way of pipe 45 having pump 46 and control valve 47, which serves to pass the liquid through indirect heat exchanger 48 and back to the line 6. Or preheating of the liquid introduced through pipe 6 into the combination tower may be effected in any other desired manner. A portion or all of the gases may be diverted through line 7, having control valve 8, while part or all of the liquid may be diverted through draw-off line 9 having valve 10. A pressure release valve 11 may be provided in the line 4, if desired.

In the tower 5 the gases and light vapors pass upwardly, around bubble trays or other contacting devices 12, and are brought thoroughly into contact with a downwardly flowing stream of absorber oil introduced through line 13, near the top of the tower. The gases, freed from constituents which are desirable for inclusion in the final desired liquid, e. g. gasoline, pass off from the top of the tower after having traversed a packed section or other knock-out equipment 14 at the top of the tower, line 15 being provided for the removal of the gases. This line may have an automatic pressure release valve 16 if desired.

The liquids introduced through line 6 pass downwardly through bubble plates or other contacting devices 17, and are subjected to partial vaporization, the vapors passing upwardly along with those introduced through line 4, while the heavier liquids, which remain unvaporized, continue downwardly through the tower. These liquids comprise also heavier ends of the vapors introduced through line 4 as well as the absorber oil introduced through line 13. A portion of the downwardly flowing liquid may be caught on trap-out tray 18 and be circulated by pump 18' through indirect heat exchanger 19 in indirect heat exchange relation with a hotter fluid and then be introduced into the lower portion of the combination tower, in order to supply the heat necessary for carrying out the operation. Alternatively an indirectly heated coil, not shown, might be placed directly in the bottom of the combination tower. Additional cooling for the intermediate portion of the absorption section of the combination tower may be provided by withdrawing condensate from a partial trap-out tray 19' and passing it through an external cooler 20, then back into a somewhat lower level in the tower. This inter-cooler serves to reduce the amount of the absorbing medium which has to be supplied in the top of the tower through pipe 13. It may be omitted if desired. Heating of the stabilizer section may be provided by withdrawing condensate from a partial trap-out tray 21 and passing this through indirect heat exchangers 22 and 23 back into a lower level in the tower. Reference numerals 24 and 25 indicate pumps for effecting the circulation of the oil.

Stabilized gasoline overflows the trap-out tray 18 and is collected in the base of the tower 5, from which it is removed by way of draw-off line 26. A portion of this stabilized product, e. g. gasoline, may be withdrawn directly from the process through line 27, after having passed through indirect heat exchanger 23 if desired. Another portion of this stabilized gasoline passes through pipe 28 into the flash tower 29, wherein partial vaporization thereof occurs. The lighter portions of the introduced liquids pass upwardly through the tower in the form of vapors and undergo fractionation therein by contact with bubble trays or other fractionating elements 30, fractionated vapors being removed from the top of the flash tower through vapor line 31 and condenser 32, resulting light condensate being collected in receiver 33. A portion of this condensate, comprising the lighter ends of gasoline, may be returned to the top of the flash tower as a refluxing medium through pipe 34, under pressure generated by pump 35. The remainder of the light condensate is preferably combined with the stabilized gasoline withdrawn through line 27, by way of line 36. A portion or all of this light condensate may be diverted through line 36' if desired, for blending purposes or any other use. As an aid in carrying out the flashing operation in the flash tower heat may be supplied at the lower portion of the tower, as for example, by removing a condensate from partial trapout tray 37, and passing it through an external indirect heat exchanger 38, by action of pump 39, then returning the heated liquid to a lower point in the flash tower. The indirect heat exchangers 19 and 38 may be provided with any kind of heating fluid from an external source. A direct reboiling coil, not shown, may be placed within the base of the flash tower 29 if desired. Alternatively steam may be introduced into the base of the flash tower through line 40.

Unvaporized liquid, comprising heavy ends of gasoline, freed from the lighter portions thereof, is withdrawn from the base of the flash tower through conduit 41 and is forced by pump 42 through indirect heat exchanger 22, wherein it is cooled somewhat by indirect heat exchange with the condensate withdrawn from trapout tray 21, and then is introduced into the top of the combination tower, after having been passed through an additional cooler 43 if necessary. This liquid so introduced into the top of the combination tower, serves as the absorbing medium mentioned hereinbefore. In passing downwardly through the absorption section of the tower it picks up the heavier constituents of the rising gases and vapors which are of such nature as to be desirable for inclusion in the stabilized liquid that is to be withdrawn from the base of the combination tower through line 26.

The various heat exchangers may be provided with by-pass valves, not shown, for control purposes. Reference numeral 44 indicates a water draw-off line for the receiver 33, which may be used in the event that open steam is introduced at the base of the flash tower for aiding in the stripping operation. The various other valves shown on the drawing, which have not been definitely mentioned, are for control purposes.

The showing of pyrometers, gauges, flow meters and other necessary accessories for the system, have been eliminated in the interest of simplicity. It is to be understood however that these control accessories may be installed at necessary positions on the apparatus to promote control and satisfactory operation.

Briefly describing the operation of the process and apparatus, the distillate in the vessel 2 contains, in addition to its gasoline contents, an appreciable amount of material undersirable for gasoline, such material being too volatile to be a satisfactory component of gasoline. Such material may include methane, ethane, propane, or corresponding hydrocarbons of other than the paraffin series. The gas leaving the vessel 2 through line 4 contains appreciable quantities of material which should properly be included in gasoline, such as butane, pentane, and heavier constituents, and their isomers and corresponding hydrocarbons of other than the paraffin series. It is desirable in this operation to transfer from the distillate to the gas the undesirable constituents, and to transfer from the gas to the distillate the desirable material; in other words to free the distillate of propane and lighter material and to recover as liquid from the gas, desired heavier products, including desired proportions of the butane.

To accomplish this effect the distillate is heated and the light material is driven off by fractional distillation. This fractionation is accomplished in the passage of the distillate downwardly through the lower portion of the tower 5, wherein it passes counter-current to the upwardly flowing vapors of relatively high temperature. The temperature held in the base of the tower 5 is a vital controlling element in the stabilizing operation and is, of course, dependent on the pressure used and on the quality of the final product desired, which quality is, in turn, dependent on various factors, including the character of the oil being treated, and the nature of the previous treatment thereof.

In its passage downwardly through the column 29 the distillate is progressively heated until it reaches a final temperature of, for example, about 320° F. more or less, which temperature reduces this material to such an extent that it is a satisfactory absorption oil. Material from the bottom of the tower 29 is withdrawn and cooled, and used as an absorber oil in the top of the column 5, where it extracts, by selective absorption, the desirable components of the gas entering said column through the line 4, as well as of those in the ascending vapor from the lower part of the column, thus serving as an absorption oil for the gas and as a reflux for the column. In other words the upper portion of the column is an absorption section and the lower portion a fractionating or stabilizing section. Some undesirable products are also absorbed in the absorption section, but these are subsequently removed in the lower portion of the tower. The amount of absorber oil is based on the amount of residue gas leaving the system and, dependent on conditions, may be equal to from 60 to 100 gallons of oil for each thousand feet of residue gas, more or less, as measured at atmospheric pressure. The amount of heat applied to the system at the bottom of the tower and to the liquid entering through line 6 is a function of the amount of absorber oil required.

In carrying out the operation the pressure in the gas separator 2 may be, for example, about 100 pounds per square inch, more or less, while that in the combination stabilization and absorption tower 5 may be about 80 pounds per square inch more or less, and the pressure in the flash tower 29 may be about five pounds per square inch, more or less. With these pressures, where it is desired to produce an ordinary stabilized gasoline, the temperature in the gas separator 2 may be about 100° F., the temperature in the base of the stabilization and absorption tower may be about 350° F. and the temperature in the base of the flash tower may be about 320° F., and the temperature in the top thereof about 225° F. These values are intended merely by way of illustration and should not be taken in any limiting sense, since they are subject to variation, depending upon the character of the charging stock and the character of the final desired product.

In place of the heat exchange cycle shown on the drawing the liquid components or distillate introduced into the combination tower may be first preheated by indirect heat exchange with the lean absorber oil withdrawn from the base of the flash tower 29, prior to the introduction thereof into the top of the combination tower, and then with the stabilized gasoline withdrawn from the base of the tower 5, in the order named. With this heat exchange arrangement likewise, the withdrawing of condensate from either or both of trap-out trays 19 and 21, the cooling and the returning thereof to the tower as refluxing medium may be omitted.

While it has been suggested that the distillate charged to the system is recovered from an oil cracking system, the process may be used in connection with the absorption and stabilization of any type of distillate and gas, whether they are equilibrium products or not. Gas and distillate may be derived from separate sources and introduced to the system, as well as distillate taken from cracking operations as suggested. In other words, the oil may be light gasoline or gas from any source or various sources in the refinery or oil field, such as gas and oil recovered from natural sources. The process is particularly useful in connection with the production of gasoline but may also be used in the formation of heavier final distillates.

The process and apparatus described hereinbefore is especially useful in connection with low pressure stabilization and absorption operations, since the amount of absorber oil available is substantially unlimited, being recycled continuously through the absorber section.

An additional feature of the invention lies in the fact that the absorber oil is currently produced from the feed stock used and a portion thereof currently extracted from the system, thus eliminating the objectionable feature of conventional absorption systems in which it is necessary periodically to clean absorber oil from the accumulated sludge and dirt and supply inevitable loss therefrom. The present system also furnishes a method by which the gas from the stabilizing operation is freed of its desirable products by absorption at relatively low pressures rather than by rectification at high pressures in accordance with prior practice.

While I have described a particular embodiment of my invention for the purposes of illustration, it should be understood that various modifications and adaptations thereof may be made within the spirit of the invention as set forth in the appended claims.

I claim:

1. In the process of stabilizing unstabilized hydrocarbons wherein said hydrocarbons are introduced into an intermediate point in a zone wherein vapors pass upwardly countercurrent to downwardly flowing condensate, residual gas is removed from the upper point of said zone, a portion of unvaporized liquid is withdrawn from the base of the stabilizing zone as a desired stabilized product, the remaining portion of unvaporized liquid from the base of said stabilizing zone is introduced into a flashing zone of reduced pressure wherein vapors are separated from unvaporized liquid, the resulting unvaporized liquid is withdrawn from the flashing zone and introduced into an upper point in said stabilizing zone above the point of introduction of said unstabilized hydrocarbons as an absorbing medium therefor and vaporized fractions are removed from said flashing zone condensed and combined with the first portion of liquid withdrawn from the base of said stabilizing zone; the improvement which comprises passing unvaporized liquid withdrawn from said flashing zone in indirect heat exchange relation with liquid oil withdrawn from said zone first mentioned prior to the introduction of said unvaporized liquid into said stabilizing zone as an absorption medium and subsequently returning said last-named liquid oil to said first-mentioned zone.

2. In a process of stabilizing unstabilized hydrocarbons wherein said hydrocarbons are introduced into an intermediate point in a zone wherein vapors pass upwardly countercurrent to downwardly flowing condensate, residual gas is removed from an upper point in said zone, a portion of unvaporized liquid is withdrawn from the base of the stabilizing zone as a desired stabilized product, a second portion of unvaporized liquid from the base of said stabilizing zone is introduced into a flashing zone of reduced pressure wherein vapors separate from unvaporized liquid, resulting unvaporized liquid is withdrawn from said flashing zone and introduced into an upper point in said stabilizing zone above the point of introduction of said unstabilized hydrocarbons as an absorbing medium and vaporized fractions from said flashing zone are condensed and combined with said first portion of the liquid withdrawn from the base of the stabilizer; the improvement which comprises passing stabilized liquid withdrawn from the base of said stabilizing zone in indirect heat exchange relation with liquid oil withdrawn from said zone first mentioned prior to the introduction of said stabilized liquid into said flashing zone and said liquid oil is subsequently returned to said zone first mentioned.

PERCIVAL C. KEITH, Jr.